(12) United States Patent
Hu et al.

(10) Patent No.: US 10,931,499 B2
(45) Date of Patent: Feb. 23, 2021

(54) SYSTEMS AND METHODS FOR WIRELESS COMMUNICATION

(71) Applicant: QUALCOMM Incorporated, San Diego, CA (US)

(72) Inventors: Jun Hu, San Diego, CA (US); Qingxin Chen, San Diego, CA (US); Reza Shahidi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/423,930

(22) Filed: May 28, 2019

(65) Prior Publication Data

US 2020/0382357 A1 Dec. 3, 2020

(51) Int. Cl.
| | |
|---|---|
| H04L 12/50 | (2006.01) |
| H04L 27/26 | (2006.01) |
| H04W 28/06 | (2009.01) |
| H04W 36/30 | (2009.01) |
| H04B 7/08 | (2006.01) |
| H04W 74/08 | (2009.01) |
| H04W 36/06 | (2009.01) |

(52) U.S. Cl.
CPC ......... H04L 27/2666 (2013.01); H04B 7/088 (2013.01); H04W 28/065 (2013.01); H04W 36/06 (2013.01); H04W 36/305 (2018.08); H04W 74/085 (2013.01)

(58) Field of Classification Search
CPC .................................................... H04L 12/50
See application file for complete search history.

(56) References Cited

U.S. PATENT DOCUMENTS

| | | | |
|---|---|---|---|
| 2008/0310357 A1* | 12/2008 | Ulupinar | H04L 1/0028 370/329 |
| 2016/0366626 A1* | 12/2016 | Krishnamoorthy | H04W 36/20 |

(Continued)

FOREIGN PATENT DOCUMENTS

| | | |
|---|---|---|
| EP | 2296296 A1 | 3/2011 |
| WO | WO-2016191939 A1 | 12/2016 |
| WO | WO-2018202081 A1 | 11/2018 |

OTHER PUBLICATIONS

3GPP TS 38.133, "3rd Generation Partnership Project; Technical Specification Group Radio Access Network; NR; Requirements for Support of Radio Resource Management (Release 15)", 3GPP TS 38.133, V15.5.0, Mar. 2019, pp. 1-893.

(Continued)

*Primary Examiner* — Dang T Ton (57) ABSTRACT

A user equipment may, based on a tuneaway, start suspend a first timer and/or deactivate a first counter and may, based on a tuneback, resume the first timer and/or activate the first counter. The first timer and first counter may be configured to be used to determine that a sufficiently large number of sufficiently closely timed beam failure indications have been received and, in response to that determination, initiate an access procedure. A user equipment may also identify an overlap of a timing of at least one radio access technology event and a timing of a tuneaway gap and may, based on the identified overlap of the timing of at least one radio access technology event and the timing of the tuneaway gap, modify the timing of the at least one radio access technology event or the timing of the tuneaway gap.

12 Claims, 5 Drawing Sheets

(56) References Cited

U.S. PATENT DOCUMENTS

2018/0042014 A1   2/2018  Wu et al.
2019/0150050 A1*  5/2019  Kinthada Venkata ......................
                                                      H04W 36/30
                                                      370/334

OTHER PUBLICATIONS

3GPP TS 38.212, "3rd Generation Partnership Project; Technical Specification Group Radio Access Network; NR; Multiplexing and Channel Coding (Release 15)", 3GPP TS 38.212, V15.5.0, Mar. 2019, pp. 1-101.
3GPP TS 38.321, "3rd Generation Partnership Project; Technical Specification Group Radio Access Network; NR; Medium Access Control (MAC) Protocol Specification (Release 15)", 3GPP TS 38.321, V15.4.0, Dec. 2018, pp. 1-77, XP051591686, [retrieved on Jan. 11, 2019] Section 5.1, p. 13-p. 22, Section 6.1.5, p. 69-p. 70.
International Search Report and Written Opinion—PCT/US2020/034278—ISA/EPO—dated Sep. 21, 2020.

* cited by examiner

SYSTEMS AND METHODS FOR WIRELESS COMMUNICATION

BACKGROUND

The present disclosure relates generally to communication systems, and more particularly, to wireless communication.

Wireless communications systems are widely deployed to provide various types of communication content such as voice, video, packet data, messaging, broadcast, and so on. These systems may be capable of supporting communication with multiple users by sharing the available system resources, e.g., time, frequency, and power. Examples of such multiple-access systems include code division multiple access (CDMA) systems, time division multiple access (TDMA) systems, frequency division multiple access (FDMA) systems, and orthogonal frequency division multiple access (OFDMA) systems, e.g., a Long Term Evolution (LTE) system or a New Radio (NR) system. A wireless multiple-access communications system may include a number of base stations or access network nodes, each simultaneously supporting communication for multiple communication devices, which may be otherwise known as user equipment (UE).

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in LTE technology and/or 5G NR technology. These improvements may also be applicable to other multi-access technologies and the telecommunication standards that employ these technologies.

SUMMARY

One aspect is a method for wireless communication. The method may comprise receiving a beam failure indication, which indicates a failure of a first beam; and determining that the beam failure indication was received. The method may also comprise, based on determining that the beam failure indication was received, starting a first timer and incrementing a first counter indicating a number of received beam failure indications. The method may also comprise, based on a tuneaway, suspending the first timer or deactivating the first counter. The method may also comprise, based on a tuneback, resuming the first timer or activating the first counter.

Another aspect is a method for wireless communication. The method may comprise performing a tuneaway and performing a tuneback. The method may also comprise, based on the tuneback, measuring a beam quality of a first beam; determining that the beam quality of the first beam fails to satisfy a beam-quality threshold; determining that a time to a scheduled beam reporting satisfies a first threshold; and based on determining that the beam quality of the first beam fails to satisfy a beam-quality threshold and determining that the time to the scheduled beam reporting satisfies the first threshold, perform beam reporting.

Yet another aspect is a method for wireless communication. The method may comprise identifying an overlap of a timing of at least one radio access technology event and a timing of a tuneaway gap. The method may also comprise, based on the identified overlap of the timing of at least one radio access technology event and the timing of the tuneaway gap, modifying the timing of the at least one radio access technology event or the timing of the tuneaway gap.

Still another aspect is an apparatus for wireless communication that may comprise one or more processors configured with processor-executable instructions to perform operations comprising any of the methods above.

Another aspect is a non-transitory processor-readable medium that may have stored thereon processor-executable instructions to perform operations comprising any of the methods above.

Yet another aspect is an apparatus for wireless communication that may comprise one or more means to perform operations comprising any of the methods above.

For purposes of summarizing, some aspects, advantages and features of a few of the embodiments of the invention have been described in this summary. Some embodiments of the invention may include some or all of these summarized aspects, advantages and features. However, not necessarily all of (or any of) these summarized aspects, advantages or features will be embodied in any particular embodiment of the invention. Thus, none of these summarized aspects, advantages and features are essential. Some of these summarized aspects, advantages and features and other aspects, advantages and features may become more fully apparent from the following detailed description and the appended claims.

BRIEF DESCRIPTION OF THE DRAWINGS

The appended drawings contain figures of preferred embodiments to further clarify the above and other aspects, advantages and features. It will be appreciated that these drawings depict only preferred embodiments of the invention and are not intended to limit its scope. These preferred embodiments will be described and explained with additional specificity and detail through the use of the accompanying drawings in which.

DETAILED DESCRIPTION

Figure 1:
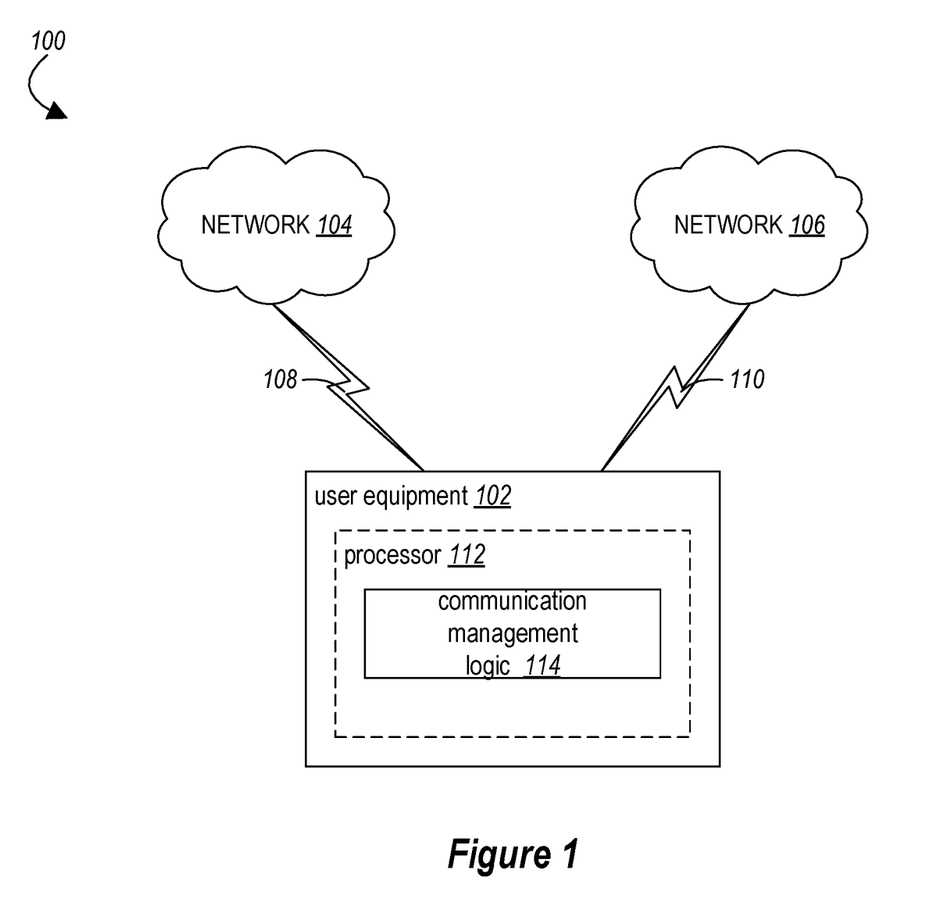
FIG. 1 is a diagram of a communication system according to some embodiments.

As shown in FIG. 1, a communication system 100 may include one or more user equipment (UE) 102. The user equipment 102 may communicate using one or more wireless communication systems (such as, CDMA systems, TDMA systems, OFDMA systems, LTE systems, NR systems, WiFi systems, Bluetooth systems, or any wireless communication systems), one or more wired communication systems, or any combination thereof.

The communication system 100 may include one or more networks, such as a first network 104 and a second network 106. The first network 104 may form at least part of a first wireless communication system, and the second network 106 may form part of at least part of a second wireless communication system. The first and second wireless communication systems 104, 106 may support the same set of one or more wireless radio access technologies (RATs) (e.g., both support the same CDMA, TDMA, OFDMA, LTE, NR, and/or WiFi standards) or may support different sets of one or more wireless radio access technologies (RATs).

In some embodiments, the user equipment 102 may be a multi-subscriber identity module (multi-SIM), multi-standby user equipment, such as a dual-SIM, dual-standby (DSDS) user equipment. In some embodiments, the user equipment 102 may be a multi-subscriber identity module (multi-SIM), multi-active user equipment, such as a dual-SIM, dual-active (DSDA) user equipment. In some embodiments, the user equipment 102 may include a single protocol stack for a radio access technology (e.g., a single protocol stack for NR) that is shared among the first subscription and the second subscription. For example, the user equipment 102 may be multi-SIM, multi-standby user equipment (e.g., a DSDS user equipment) that includes a single protocol stack for a radio access technology that is shared among the first subscription and the second subscription. In some embodiments, the user equipment 102 may include a first protocol stack for a radio access technology (e.g., a first protocol stack for NR) for the first subscription and a different second protocol stack for the same radio access technology (e.g., a different second protocol stack for NR) for the second subscription. For example, the user equipment 102 may be multi-SIM, multi-active user equipment (e.g., a DSDA user equipment) that includes a first protocol stack for a radio access technology for the first subscription and a different second protocol stack for the same radio access technology for the second subscription.

The user equipment 102 may be configured to use a first wireless communication link 108 to communicate with the first network 104 via a first subscription (e.g., using a first SIM card or a first virtual SIM) and use a second wireless communication link 110 to communicate with the second network 106 via a second subscription (e.g., using a second SIM card or a second virtual SIM). The user equipment 102 may receive voice services, data services or both using the first wireless communication link 108 with the first network 104 via the first subscription. The user equipment 102 may receive voice services, data services or both using the second wireless communication link 110 with the second network 106 via the second subscription.

In some instances, such as when the user equipment 102 is a multi-SIM, multi-standby user equipment, the user equipment 102 may perform a tuneaway from the first network 104 and the first subscription to the second network 106 and the second subscription, such that the user equipment 102 suspends communication via the first network 104 and the first subscription and resumes communication via the second network 106 and the second subscription. In such instances, after communicating via the second network 106 and the second subscription, the user equipment 102 may later perform a tuneback from the second network 106 and the second subscription to the first network 104 and the first subscription, such that the user equipment 102 suspends communication via the second network 106 and the second subscription and resumes communication via the first network 104 and the first subscription.

Applicants have observed that during a tuneaway gap (i.e., the time between a user equipment's tuneway from a network and subscription and the user equipment's tuneback to the network and subscription) one or more link conditions may worsen for one or more links between the user equipment and the network, which may degrade performance and user experience. Applicants have also observed that the user equipment may miss one or more radio access technology events for the network and subscription during the tuneaway gap, which may degrade performance and user experience. One or more embodiments below may help reduce or avoid such degradations of performance and user experience and/or may provide other advantages.

Figure 2:
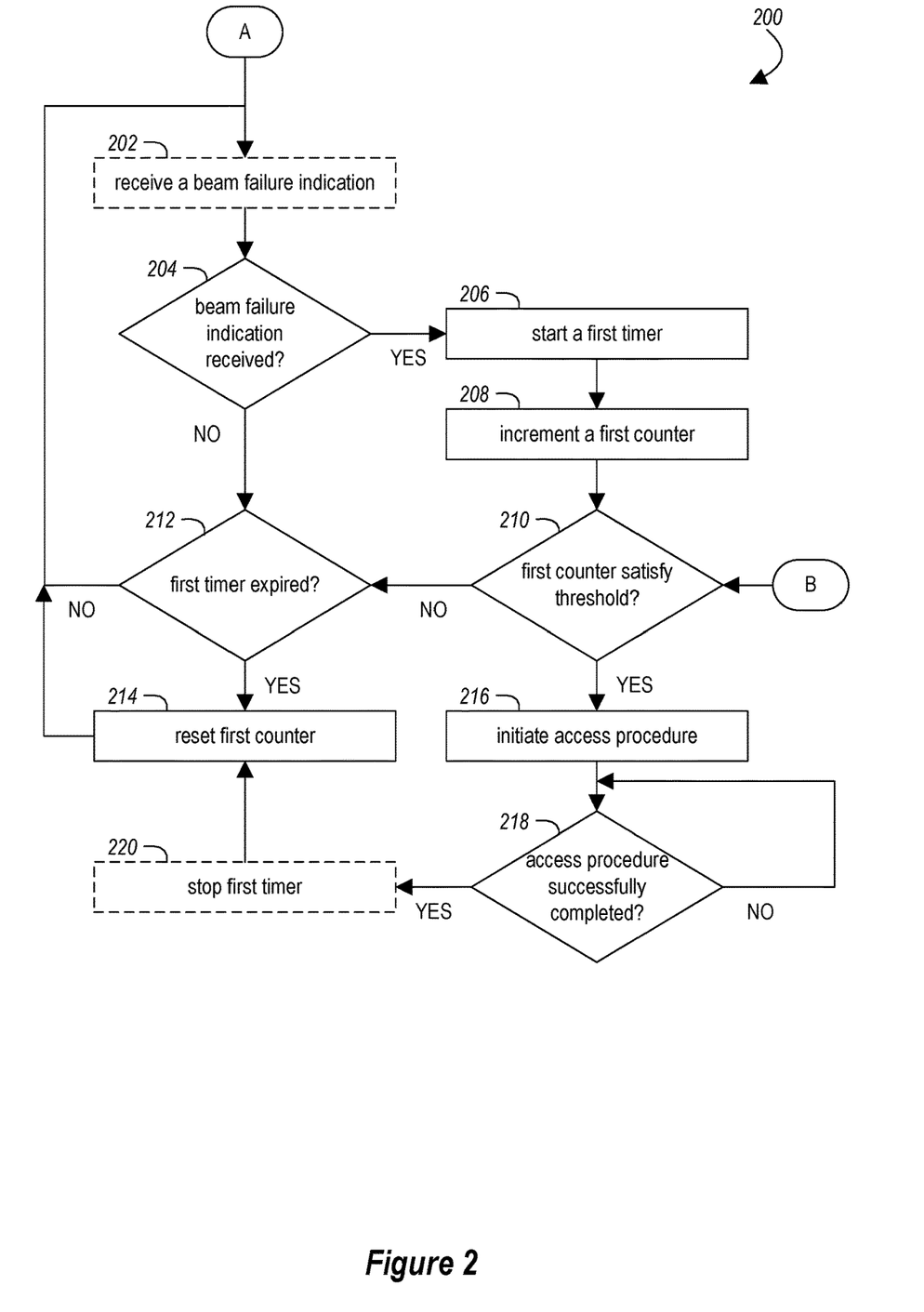
FIG. 2 is a flowchart illustrating a method for wireless communication according to some embodiments.

FIG. 2 is a flowchart illustrating a method 200 for wireless communication according to some embodiments, which may be performed by one or more processors of a user equipment—such as one or more processors 112 (FIG. 1) that may be configured with communication management logic 114 which performs the method 200, performs other functionality (including other functionality described herein), or performs any combination thereof. In some embodiments, the processor may implement a Medium Access Control (MAC) entity that performs the method 200, performs other functionality (including other functionality described herein), or performs any combination thereof. One example of a Medium Access Control (MAC) entity that may be used in connection with embodiments described herein is disclosed in 3GPP TS 38.321 V15.4.0 (2018-12) Technical Specification; 3rd Generation Partnership Project; Technical Specification Group Radio Access Network; NR; Medium Access Control (MAC) protocol specification (Release 15), the disclosure of which is incorporated by reference herein in its entirety. As shown in FIG. 2, the method 200 may include one or more blocks, such as optional block 202, block 204, block 206, block 208, block 210, block 212, block 214, block 216, block 218, optional block 220 or any combination thereof.

As shown in FIG. 2, at optional block 202, the processor may receive a beam failure indication, which indicates a failure of a first beam. For example, the processor may implement a Medium Access Control (MAC) entity that may receive a beam failure indication from one or more lower layers. In some embodiments, the beam failure indication may indicate a failure of a millimeter wave (mmW) beam, a failure of a sub-6-gigahertz (sub-6 GHz) beam, or a failure of another type of beam.

At block 204, the processor may determine whether a beam failure indication was received (e.g., received at block 202).

If a beam failure was received (e.g., based on determining that a beam failure indication was received at block 204), the processor may start a first timer at block 206, may increment a first counter at block 208, and may determine whether the first counter satisfies a threshold at block 210. In some embodiments, the first counter may indicate a number of received beam failure indications, which may be incremented at block 208. One example of a first timer that may be used in connection with embodiments described herein is beamFailureDetectionTimer, disclosed in Section 5.17 of 3GPP TS 38.321 V15.4.0 (2018-12). One example of first counter that may be used in connection with embodiments described herein is BFI COUNTER, disclosed in Section 5.17 of 3GPP TS 38.321 V15.4.0 (2018-12). One example of a threshold that may be used in connection with embodiments described herein is being greater than or equal to beamFailureInstanceMaxCount, disclosed in Section 5.17 of 3GPP TS 38.321 V15.4.0 (2018-12). It will be appreciated, however, that a variety of other timers, counters, and thresholds may be used.

In some embodiments, to start the first timer at block 206, the processor may configure the first timer to expire after a defined amount of time elapses. In some instances, starting the first timer may comprise configuring the first timer to expire after a defined amount of time elapses, when the first timer was not configured nor running (e.g., the first timer may not have been previously started or the first timer was expired). In some instances, starting the first timer may comprise configuring the first timer to expire after a defined amount of time elapses, when the first timer was already configured and running but before the timer had expired (which may also be referred to as "restarting" the first timer).

If the first counter fails to satisfy a threshold (e.g., based on determining that the first counter fails to satisfy a threshold at block 210), the processor may determine whether the first timer has expired at block 212. If the first timer has not expired (e.g., based on determining that the first timer has not expired at block 212), the processor may return to optional block 202, to block 204 or both. If the first timer has expired (e.g., based on determining that the first timer has expired at block 212), the processor may reset the first counter at block 214 and then may return to optional block 202, to block 204 or both. In some embodiments, to reset the first counter at block 214, the processor may set the first counter to indicate zero received beam indications.

If the first counter satisfies a threshold (e.g., based on determining that the first counter satisfies a threshold at block 210), the processor may initiate an access procedure at block 216. One example of an access procedure that may be used in connection with embodiments described herein is a random access procedure, such as disclosed in Section 5.1 of 3GPP TS 38.321 V15.4.0 (2018-12). It will be appreciated, however, that a variety of other access procedures may be used.

The processor may determine whether the access procedure was successfully completed at block 218. If the access procedure is not successfully completed (e.g., based on determining that the access procedure was not successfully completed at block 218), the processor may reattempt to complete the access procedure one or more additional times. If the access procedure is successfully completed (e.g., based on determining that the access procedure was successfully completed at block 218), the processor may stop the first timer at optional block 220 (if the timer is configured, i.e., if the timer is running), may reset the first counter at block 214, and may return to optional block 202, to block 204 or both.

As shown in FIG. 2, as consecutive beam failure indications are received within the defined amount of time to which the first timer is configured, the first timer may be repeatedly restarted and the first counter may be repeatedly incremented. When a sufficiently large number of sufficiently closely timed beam failure indications have been received (e.g., the first counter satisfies the threshold at block 210), it indicates that the performance of the user equipment 102 has been degraded, thus degrading user experience. Accordingly, given this degradation of performance and user experience, an access procedure may be initiated (e.g., at block 216) to improve performance of the user equipment 102 and improve user experience.

Figure 3:
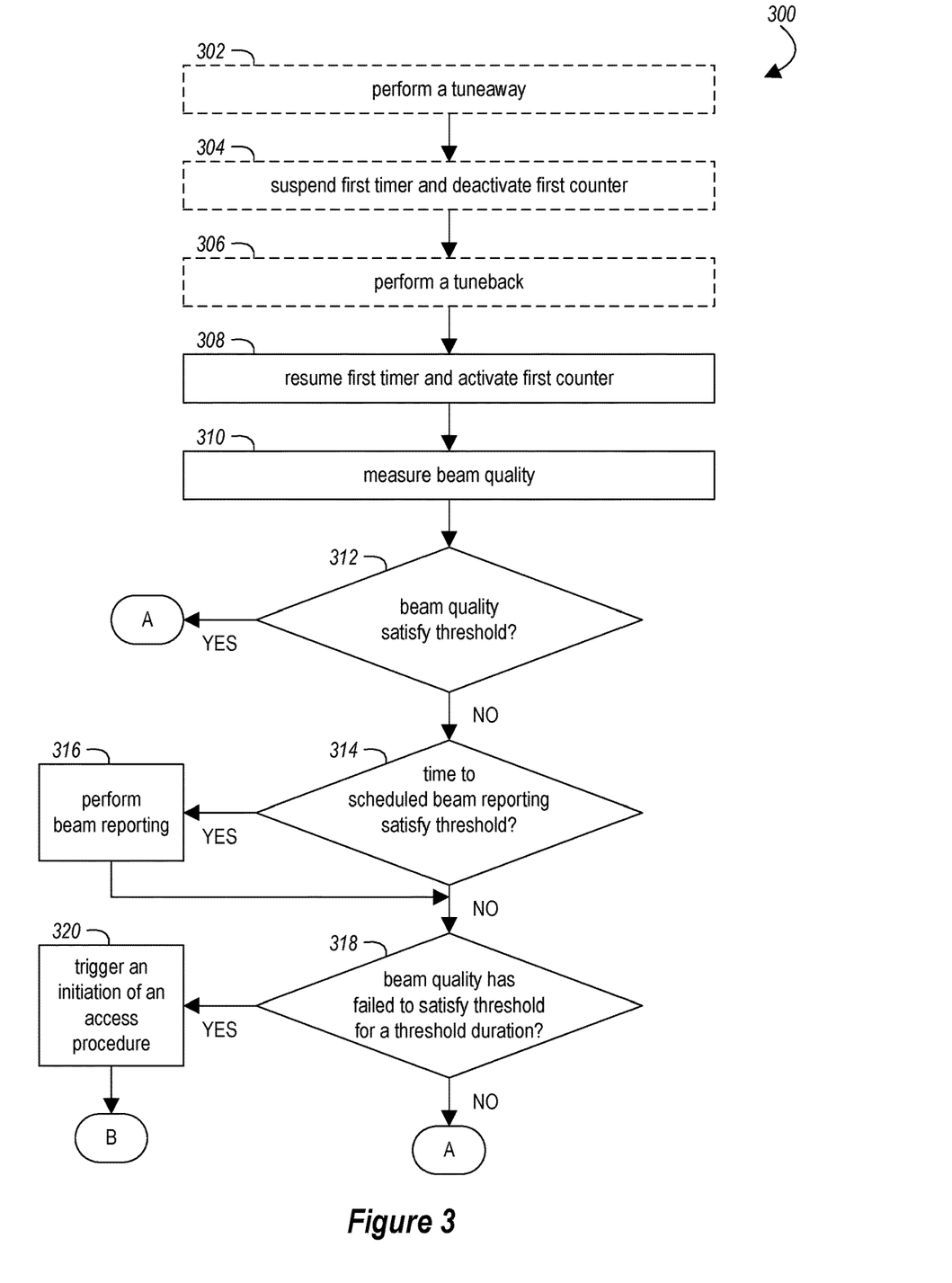
FIG. 3 is a flowchart illustrating a method for wireless communication according to some embodiments.

FIG. 3 is a flowchart illustrating a method 300 for wireless communication according to some embodiments, which may be performed by one or more processors of a user equipment—such as one or more processors 112 (FIG. 1) that may be configured with communication management logic 114 which performs the method 300, performs other functionality (including other functionality described herein), or performs any combination thereof. As shown in FIG. 3, the method 300 may include one or more blocks, such as optional block 302, optional block 304, optional block 306, block 308, block 310, block 312, block 314, block 316, block 318, block 320 or any combination thereof.

As shown in FIG. 3, at optional block 302, the processor may perform a tuneaway, for example, as discussed above with reference to FIG. 1.

At optional block 304, the processor may suspend the first timer (which may be started at block 206 in FIG. 2), may deactivate the first counter (which may be incremented at block 208), or may suspend the first timer and deactivate the first counter. In some embodiments in which the first timer is a countdown timer, suspending the first timer at optional block 304 comprises halting the countdown. It will be appreciated that the first timer may be any sort of timer and may be suspended in any other suitable manner. In some embodiments, deactivating the first counter at block 304 may comprise refraining from modifying the first counter (e.g., refraining from incrementing the first counter at block 208 in FIG. 2 and refraining from resetting the first counter at block 214 in FIG. 2).

In some embodiments, based on the tuneaway (optional block 302), the processor may suspend the first timer and/or may deactivate the first counter at optional block 304. For example, in some instances, at optional block 304, based on an imminent performance of the tuneaway being predicted, the processor may suspend the first timer and/or may deactivate the first counter before the tuneaway is performed at optional block 302. Also, for example, in other instances, based on the tuneaway being performed at optional block 302, the processor may suspend the first timer and/or may deactivate the first counter at optional block 304.

At optional block 306, the processor may perform a tuneback, for example, as discussed above with reference to FIG. 1.

At block 308, the processor may resume the first timer (which was suspended at optional block 304), may reactivate the first counter (which was deactivated at optional block 304), or may resume the first timer and activate the first counter.

In some embodiments, based on the tuneback (optional block 306), the processor may resume the first timer and/or may activate the first counter at block 308. For example, in some instances, at block 308, based on an imminent performance of the tuneback being predicted, the processor may resume the first timer and/or may activate the first counter before the tuneback is performed at optional block 306. Also, for example, in other instances, in response to the tuneback being performed at optional block 306, the processor may resume the first timer and/or may activate the first counter at block 308.

Suspending the first timer based on the tuneaway, deactivating the first counter based on the tuneaway, resuming the first timer based on the tuneback, and/or activating the first counter based on the tuneback may improve the functioning of the user equipment 102. In further detail, after a tuneaway from the first network 104 and the first subscription to the second network 106 and the second subscription, the processor might not receive beam failure indications (e.g., at block 202 in FIG. 2) for a beam used for communication via the first network 104 and the first subscription until after the processor performs a tuneback. If the processor does not receive one or more beam failure indications that the processor would have otherwise received were it not for the tuneaway, the processor might not restart the first timer (e.g., at block 206 in FIG. 2)—causing the first timer to expire which causes the first counter to be reset (e.g., at block 212 and block 214 in FIG. 2). Resetting the first counter in such situations may delay detecting that a sufficiently large number of sufficiently closely timed beam failure indications have been received (e.g., the first counter satisfies the threshold at block 210), thus delaying an initiation of the access procedure at block 216 to improve performance of the user equipment 102 and improve user experience.

Suspending the first timer based on the tuneaway (which may prevent an undesired expiration of the first timer) and/or deactivating the first counter based on the tuneaway (which may prevent an undesired resetting of the first counter) may reduce an undesired delay in detecting that a sufficiently large number of sufficiently closely timed beam failure indications have been received, which may reduce an undesired delay in initiating the access procedure at block 216 to improve performance of the user equipment 102 and improve user experience. Accordingly, by suspending the first timer based on the tuneaway and/or deactivating the first counter based on the tuneaway, an improvement of the performance of the user equipment 102 and an improvement of the user experience may occur sooner.

After the tuneback to the first network 104 and the first subscription, the processor may be able to receive one or more beam failure indications for the beam used for communication via the first network 104 and the first subscription. Accordingly, as discussed above at block 308, the processor may resume the first timer based on the tuneback and/or activate the first counter based on the tuneback, which may allow the processor to continue an ongoing process of detecting that a sufficiently large number of sufficiently closely timed beam failure indications have been received, which improves the functioning of the user equipment 102 and improves user experience.

At block 310, the processor may measure a beam quality of the first beam (for which a beam failure indication may be received at optional block 202 in FIG. 2). In particular, based on the tuneback (optional block 306), the processor may measure a quality of the first beam. In some embodiments, at block 310, the processor may measure a quality of the first beam according to, for example, 3GPP TS 38.133 V15.5.0 (2019-03); 3rd Generation Partnership Project; Technical Specification Group Radio Access Network; NR; Requirements for support of radio resource management (Release 15), the disclosure of which is incorporated by reference herein in its entirety. For instance, a network may configure one or more reference signals for the user equipment 102 to monitor, and the quality of the first beam measured at block 310 may be a Reference Signal Received Power (RSRP).

At block 312, the processor may determine whether a beam quality of the first beam (e.g., the beam quality measured at block 310) satisfies a threshold, for instance, a beam-quality threshold.

If the beam quality of the first beam satisfies a beam-quality threshold (e.g., based on determining that the beam quality of the first beam satisfies a beam-quality threshold at block 312), the processor may return to optional block 202 (FIG. 2), to block 204 (FIG. 2) or both. As noted above, Applicants have observed that during a tuneaway gap, one or more link conditions may worsen for one or more links between the user equipment and the network, which may degrade performance and user experience. If the processor determines that the beam quality of the first beam satisfies a beam-quality threshold at block 312, link conditions may not have worsened (or may not have not sufficiently worsened) during the tuneaway gap and thus the processor may return to the method 200 in FIG. 2 without taking additional action, such as, without taking one or more of the additional actions reflected in block 314, block 316, block 318, and block 320.

However, if the processor determines that the beam quality of the first beam fails to satisfy a beam-quality threshold at block 312, link conditions may have worsened during the tuneaway gap and thus the processor may take one or more additional actions (such as, the additional actions reflected in block 314, block 316, block 318, and block 320) to improve performance and user experience.

In further detail, if the beam quality of the first beam fails to satisfy a beam-quality threshold (e.g., based on determining that the beam quality of the first beam fails to satisfy a beam-quality threshold at block 312), the processor may determine whether a time to a scheduled beam reporting (e.g., how long until a next scheduled beam reporting occurs) satisfies a threshold at block 314. In some embodiments, a network may have scheduled the beam reporting according to, for example, 3GPP TS 38.133 V15.5.0 (2019-03); 3rd Generation Partnership Project; Technical Specification Group Radio Access Network; NR; Requirements for support of radio resource management (Release 15). In some embodiments, the beam reporting may be scheduled according to a periodic schedule, a semi-persistent schedule or an aperiodic schedule.

If the time to the scheduled beam reporting satisfies a threshold (e.g., based on determining that the time to the scheduled beam reporting satisfies a threshold at block 314), the processor may perform beam reporting at block 316. As noted above, Applicants have observed that during a tuneaway gap, one or more link conditions may worsen for one or more links between the user equipment and the network, which may degrade performance and user experience. The user equipment 102 may have been previously scheduled to perform beam reporting, which may improve performance and user experience. However, if the beam quality of the first beam is too low (e.g., fails to satisfy a beam-quality threshold at block 312) and if the scheduled bean reporting is too far away in the future (e.g., the time to the scheduled beam reporting satisfies a threshold at block 314), the processor may perform beam reporting at block 316 sooner than scheduled, which may improve performance and user experience sooner than if the processor had waited until the previously scheduled beam reporting time. Of course, if the time to the scheduled beam reporting fails to satisfy a threshold and thus the scheduled beam reporting is not too far away in the future, the processor may perform beam reporting as previously scheduled (not shown). In some embodiments, the processor may perform beam reporting via Physical Uplink Control Channel (PUCCH) or Physical Uplink Shared Channel (PUSCH), for example, according to 3GPP TS 38.212 V15.5.0 (2019-03); 3rd Generation Partnership Project; Technical Specification Group Radio Access Network; NR; Multiplexing and channel coding (Release 15), the disclosure of which is incorporated by reference herein in its entirety.

In some embodiments as shown above with respect to FIG. 3, if the beam quality of the first beam fails to satisfy a beam-quality threshold (e.g., based on determining that the beam quality of the first beam fails to satisfy a beam-quality threshold at block 312) and if the time to the scheduled beam reporting satisfies a first threshold (e.g., based on determining that the time to the scheduled beam reporting satisfies a threshold at block 314), the processor may perform beam reporting at block 316.

In some instances, if the time to the scheduled beam reporting fails to satisfy a threshold (e.g., based on determining that the time to the scheduled beam reporting fails to satisfy a threshold at block 314), the processor may proceed to, at block 318, determine whether the beam quality of the first beam has failed to satisfy the beam-quality threshold for the threshold duration. In other instances, if the time to the scheduled beam reporting satisfies a threshold (e.g., based on determining that the time to the scheduled beam reporting satisfies a threshold at block 314), the processor may proceed to perform beam reporting at block 316 and then proceed to, at block 318, determine whether the beam quality of the first beam has failed to satisfy the beam-quality threshold for the threshold duration.

In further detail, as shown in FIG. 3, the processor may, at block 318, determine whether the beam quality of the first beam has failed to satisfy a beam-quality threshold for a threshold duration. For example, based on the tuneback performed at block 306, the processor may, at block 318, determine whether the beam quality of the first beam has failed to satisfy a beam-quality threshold for a threshold duration. In some embodiments, the processor may, at block 318, determine whether the beam quality of the first beam has failed to satisfy the beam-quality threshold from block 312 for a threshold duration.

If the beam quality of the first beam has failed to satisfy a beam-quality threshold for the threshold duration (e.g., based on determining that the beam quality of the first beam has failed to satisfy a beam-quality threshold for the threshold duration at block 318), the processor may trigger an initiation of an access procedure (e.g., a random access procedure) at block 320. As noted above, Applicants have observed that during a tuneaway gap, one or more link conditions may worsen for one or more links between the user equipment and the network, which may degrade performance and user experience. If the beam quality of the first beam is too low (e.g., fails to satisfy a beam-quality threshold at block 312) and if the beam quality of the first beam has been too low for too long (e.g., the beam quality of the first beam has failed to satisfy a beam-quality threshold for the threshold duration at block 318), the processor may trigger an initiation of an access procedure at block 320 sooner than the initiation would have otherwise occurred, which may improve performance and user experience sooner than, for example, if the processor had waited to initiate the access procedure based on the method 200 (FIG. 2) alone.

In some embodiments, to trigger an initiation of an access procedure at block 320, the processor may set the first counter to a threshold-satisfying value; the processor may then proceed to block 210 (FIG. 2) at which the processor may determine that the first counter satisfies the threshold and then may initiate an access procedure based on determining that the first counter satisfies a threshold at block 216.

If the beam quality of the first beam has not failed to satisfy a beam-quality threshold for the threshold duration (e.g., based on determining that the beam quality of the first beam has not failed to satisfy a beam-quality threshold for the threshold duration at block 318), the processor may return to optional block 202 (FIG. 2), to block 204 (FIG. 2) or both.

Figure 4:
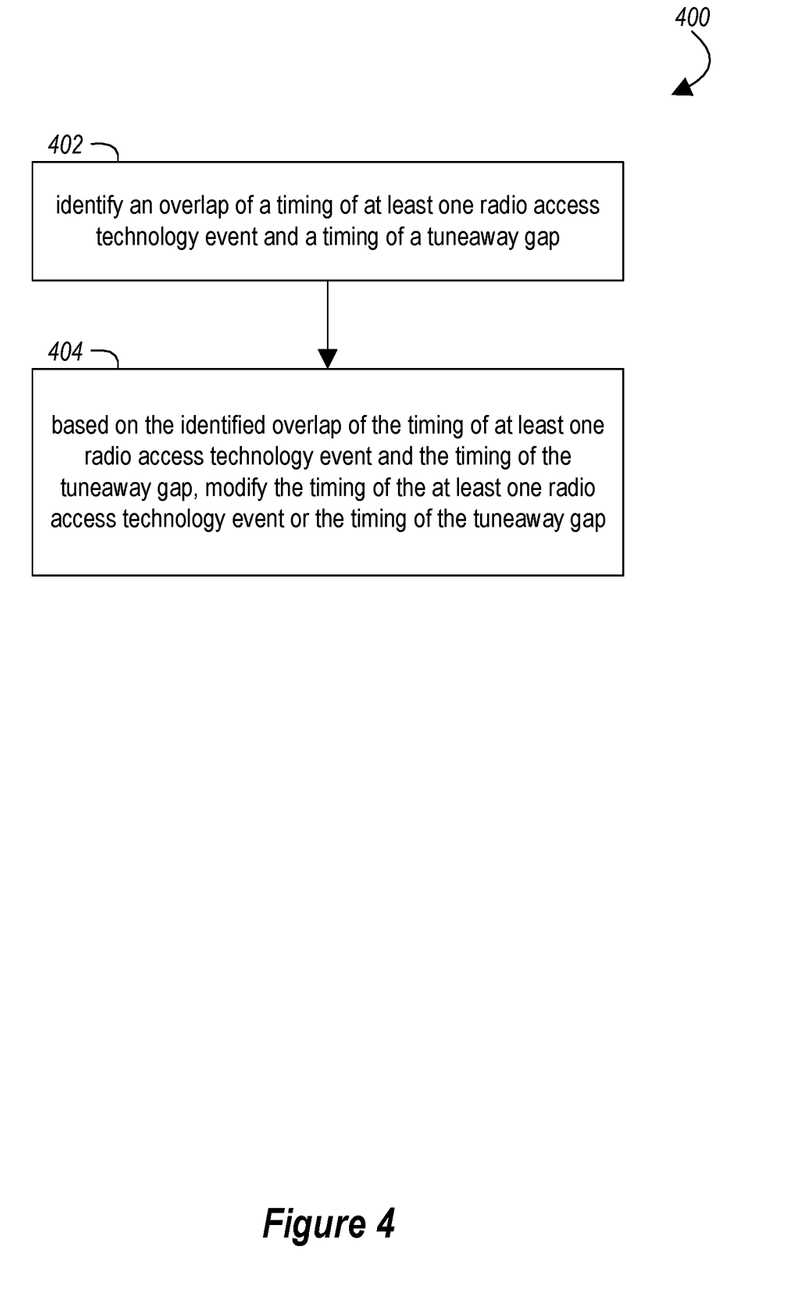
FIG. 4 is a flowchart illustrating a method for wireless communication according to some embodiments.

FIG. 4 is a flowchart illustrating a method 400 for wireless communication according to some embodiments, which may be performed by one or more processors of a user equipment—such as one or more processors 112 (FIG. 1) that may be configured with communication management logic 114 which performs the method 400, performs other functionality (including other functionality described herein), or performs any combination thereof. As shown in FIG. 4, the method 400 may include one or more blocks, such as block 402, block 404, or any combination thereof.

As shown in FIG. 4, at block 402, the processor may identify an overlap of a timing of at least one radio access technology event and a timing of a tuneaway gap.

At block 404, the processor may, based on the identified overlap of the timing of at least one radio access technology event and the timing of the tuneaway gap (which was identified at block 402), modify the timing of the at least one radio access technology event or the timing of the tuneaway gap. In some embodiments, modifying the timing of the at least one radio access technology event or the timing of the tuneaway gap may eliminate the overlap of the timing of at least one radio access technology event and the timing of the tuneaway gap. In some embodiments, modifying the timing of the at least one radio access technology event or the timing of the tuneaway gap may reduce the overlap of the timing of at least one radio access technology event and the timing of the tuneaway gap.

As noted above, Applicants have also observed that the user equipment may miss one or more radio access technology events for the network and subscription during the tuneaway gap, which may degrade performance and user experience. Modifying the timing of the at least one radio access technology event or the timing of the tuneaway gap at block 404 may help the user equipment to avoid missing the at least one radio access technology event during the tuneaway gap, which may avoid the degradation of performance and user experience that might have otherwise occurred if the user equipment had missed the at least one radio access technology event.

In one embodiment, at block 402, the at least one radio access technology event may comprise a scheduled beam measurement and reporting, and the modifying the timing of the at least one radio access technology event or the timing of the tuneaway gap at block 404 may comprise rescheduling the beam measurement and reporting to occur before the tuneaway gap or after the tuneaway gap.

In one embodiment, at block 402, the at least one radio access technology event may comprise a beam switch that is likely to occur in response to a scheduled beam measurement and reporting, and the modifying the timing of the at least one radio access technology event or the timing of the tuneaway gap at block 404 may comprise (1) rescheduling the beam measurement and reporting such that the beam switch occurs before the tuneaway gap or (2) rescheduling the beam measurement and reporting to occur after the tuneaway gap such that the beam switch occurs after the tuneaway gap.

In one embodiment, at block 402, the at least one radio access technology event may comprise a beam switch point, and the modifying the timing of the at least one radio access technology event or the timing of the tuneaway gap at block 404 may comprise rescheduling the beam switch point to occur after the tuneaway gap.

In one embodiment, at block 402, the at least one radio access technology event may comprise beam management during a random access procedure, and the modifying the timing of the at least one radio access technology event or the timing of the tuneaway gap at block 404 may comprise preventing the tuneaway of the tuneaway gap from occurring.

In one embodiment, at block 402, the at least one radio access technology event may comprise beam management during acquisition, and the modifying the timing of the at least one radio access technology event or the timing of the tuneaway gap at block 404 may comprise preventing the tuneaway of the tuneaway gap from occurring during acquisition of a frequency and allowing the tuneaway of the tuneaway gap between acquisition of different frequencies.

As shown above, in some embodiments, a determination may be made with respect to a threshold (e.g., at block 210 in FIG. 2, at block 312 in FIG. 3, at block 314 in FIG. 3, and block 318 in FIG. 3). In such embodiments, data defining the threshold (e.g., data defining a threshold value) may be used to perform the determination (e.g., make a comparison with respect to the threshold value). In some instances, the user equipment 102 may be provisioned with the data defining the threshold during manufacturing. In some instances, the user equipment 102 may receive the data defining the threshold via a wireless communication link (e.g., the link 108 or the link 110) from a network (e.g., the network 104 or the network 106).

Figure 5:
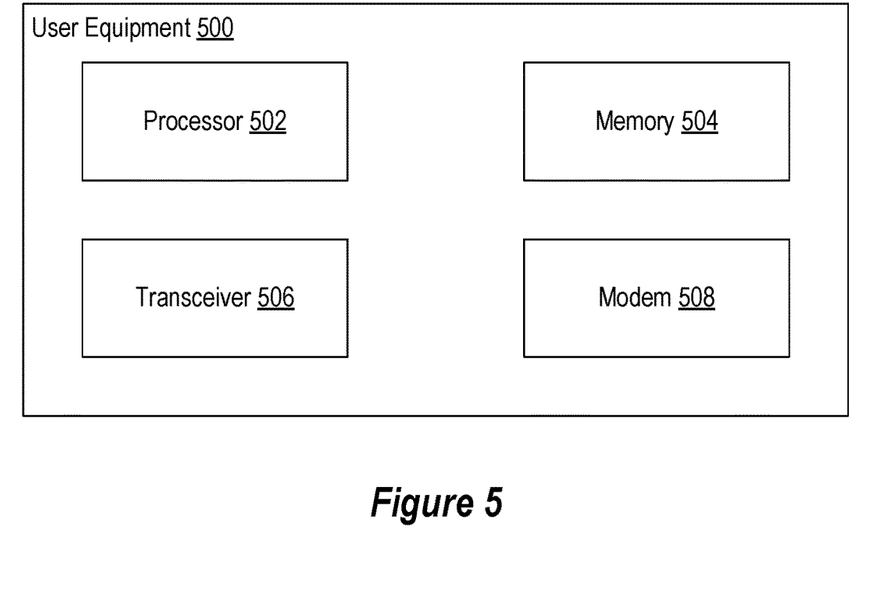
FIG. 5 is a diagram illustrating a user equipment according to some embodiments.

Various embodiments (including, but not limited to, embodiments discussed above with reference to FIGS. 1-4) may be implemented in any user equipment, one example of which is illustrated in FIG. 5. For example, the user equipment 500 may include one or more processors 502 coupled to a touch screen controller and one or more internal memory 504. The processor 502 may be one or more multicore integrated circuits designated for general or specific processing tasks. The internal memory 504 may be volatile or non-volatile memory, and may also be secure and/or encrypted memory, or unsecure and/or unencrypted memory, or any combination thereof. The touch screen controller and the processor 502 may also be coupled to a touch screen panel, such as a resistive-sensing touch screen, capacitive-sensing touch screen, infrared sensing touch screen, etc. The user equipment 500 may have one or more radio signal transceivers 506 (e.g., Peanut®, Bluetooth®, Zigbee®, Wi-Fi, RF, cellular, etc.) and antennae, for sending and receiving, coupled to each other and/or to the processor 502. The transceiver 506 and antennae may be used with the above-mentioned circuitry to implement the various wireless transmission protocol stacks and interfaces. The user equipment 500 may include one or more cellular network wireless modems 508 that enable communication via one or more cellular networks and that are coupled to the processor.

The user equipment 500 may include a peripheral device connection interface coupled to the processor 502. The peripheral device connection interface may be singularly configured to accept one type of connection, or multiply configured to accept various types of physical and communication connections, common or proprietary, such as USB, FireWire, Thunderbolt, Ethernet, or PCIe. The peripheral device connection interface may also be coupled to a similarly configured peripheral device connection port. The user equipment 500 may also include speakers for providing audio outputs.

The user equipment 500 may also include a housing—which may be constructed of plastic, metal, one or more other materials, or a combination of thereof—for containing all or some of the components discussed herein. The user equipment 500 may include a power source coupled to the processor 502, such as a disposable or rechargeable battery. The rechargeable battery may also be coupled to the peripheral device connection port to receive a charging current from a source external to the user equipment 500.

The processor 502 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory before they are accessed and loaded into the processor 502. The processor 502 and may include internal memory sufficient to store the application software instructions. In many devices, the internal memory may be a volatile or nonvolatile memory, such as flash memory, or a mixture of both. For the purposes of this description, a general reference to memory refers to memory accessible by the processor 502 including internal memory or removable memory plugged into the device and memory within the processor 502 itself.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary block that is described as "based on condition A" may be based on both a condition A and a condition B without departing from the scope of the present disclosure. In other words, as used herein, the phrase "based on" shall be construed in the same manner as the phrase "based at least in part on."

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In various embodiments, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module, which may reside on a non-transitory computer-readable or processor-readable storage medium. Non-transitory server-readable, computer-readable or processor-readable storage media may be any storage media that may be accessed by a computer or a processor. By way of example but not limitation, such non-transitory server-readable, computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory server-readable, computer-readable and processor-readable media. Additionally, the operations of a method or algorithm may reside as one or any combination or set of codes and/or instructions on a non-transitory server-readable, processor-readable medium and/or computer-readable medium, which may be incorporated into a computer program product.

The methods and systems described above require no particular component or function. Thus, any described component or function—despite its advantages—is optional. Also, some or all of the described components and functions described above may be used in connection with any number of other suitable components and functions.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

Moreover, although this invention has been described in terms of certain preferred embodiments, other embodiments apparent to those of ordinary skill in the art are also within the scope of this invention. Accordingly, the scope of the invention is intended to be defined only by the claims which follow.

What is claimed is:

1. An apparatus for wireless communication, the apparatus comprising:
one or more processors configured with processor-executable instructions to perform operations comprising:
performing a tuneaway;
performing a tuneback; and
based on the tuneback:
measuring a beam quality of a first beam;
determining that the beam quality of the first beam fails to satisfy a beam-quality threshold;
determining that a time to a scheduled beam reporting satisfies a first threshold; and
based on determining that the beam quality of the first beam fails to satisfy the beam-quality threshold and determining that the time to the scheduled beam reporting satisfies the first threshold, perform beam reporting.

2. An apparatus for wireless communication, the apparatus comprising:
one or more processors configured with processor-executable instructions to perform operations comprising:
identifying an overlap of a timing of at least one radio access technology event and a timing of a tuneaway gap, wherein the at least one radio access technology event comprises a scheduled beam measurement and reporting; and
based on the identified overlap of the timing of at least one radio access technology event and the timing of the tuneaway gap, modifying the timing of the at least one radio access technology event or the timing of the tuneaway gap, wherein the modifying the timing of the at least one radio access technology event or the timing of the tuneaway gap comprises rescheduling the beam measurement and reporting to occur before the tuneaway gap or after the tuneaway gap.

3. An apparatus for wireless communication, the apparatus comprising:
one or more processors configured with processor-executable instructions to perform operations comprising:
identifying an overlap of a timing of at least one radio access technology event and a timing of a tuneaway gap, wherein the at least one radio access technology event comprises a beam switch that is likely to occur in response to a scheduled beam measurement and reporting; and
based on the identified overlap of the timing of at least one radio access technology event and the timing of the tuneaway gap, modifying the timing of the at least one radio access technology event or the timing of the tuneaway gap, wherein the modifying the timing of the at least one radio access technology event or the timing of the tuneaway gap comprises:
rescheduling the beam measurement and reporting such that the beam switch occurs before the tuneaway gap; or
rescheduling the beam measurement and reporting to occur after the tuneaway gap such that the beam switch occurs after the tuneaway gap.

4. An apparatus for wireless communication, the apparatus comprising:
one or more processors configured with processor-executable instructions to perform operations comprising:
identifying an overlap of a timing of at least one radio access technology event and a timing of a tuneaway gap, wherein the at least one radio access technology event comprises a beam switch point; and
based on the identified overlap of the timing of at least one radio access technology event and the timing of the tuneaway gap, modifying the timing of the at least one radio access technology event or the timing of the tuneaway gap, wherein the modifying the timing of the at least one radio access technology event or the timing of the tuneaway gap comprises rescheduling the beam switch point to occur after the tuneaway gap.

5. An apparatus for wireless communication, the apparatus comprising:
one or more processors configured with processor-executable instructions to perform operations comprising:
identifying an overlap of a timing of at least one radio access technology event and a timing of a tuneaway gap, wherein the at least one radio access technology event comprises beam management during acquisition; and
based on the identified overlap of the timing of at least one radio access technology event and the timing of the tuneaway gap, modifying the timing of the at least one radio access technology event or the timing of the tuneaway gap, wherein the modifying the timing of the at least one radio access technology event or the timing of the tuneaway gap comprises preventing a tuneaway of the tuneaway gap from occurring during acquisition of a frequency and allowing the tuneaway of the tuneaway gap between acquisition of different frequencies.

6. An apparatus for wireless communication, the apparatus comprising:
one or more processors configured with processor-executable instructions to perform operations comprising:
receiving a beam failure indication, which indicates a failure of a first beam;
determining that the beam failure indication was received;
based on determining that the beam failure indication was received:
starting a first timer; and
incrementing a first counter indicating a number of received beam failure indications;
based on a tuneaway:
suspending the first timer; or
deactivating the first counter; and
based on a tuneback:
resuming the first timer; or
activating the first counter.

7. The apparatus of claim 6, wherein the operations further comprise:
determining that the first counter satisfies a threshold; and
based on determining that the first counter satisfies the threshold, initiating a random access procedure.

8. The apparatus of claim 6, wherein the operations further comprise:
determining that the first timer has expired; and
based on determining that the first timer has expired, resetting the first counter.

9. The apparatus of claim 6, wherein the operations further comprise:
performing the tuneaway; and
performing the tuneback.

10. The apparatus of claim 6, wherein the operations further comprise:
based on the tuneback:
measuring a beam quality of the first beam;
determining that the beam quality of the first beam fails to satisfy a beam-quality threshold;
determining that a time to a scheduled beam reporting satisfies a first threshold; and
based on determining that the beam quality of the first beam fails to satisfy the beam-quality threshold and determining that the time to the scheduled beam reporting satisfies the first threshold, perform beam reporting.

11. The apparatus of claim 6, wherein the operations further comprise: based on the tuneback:
determining that a beam quality of the first beam has failed to satisfy a beam quality threshold for a threshold duration; and
based on determining that the beam quality of the first beam has failed to satisfy the beam quality threshold for the threshold duration, triggering an initiation of a random access procedure.

12. The apparatus of claim 6, wherein the operations further comprise: based on the tuneback:
determining that a beam quality of the first beam has failed to satisfy a beam quality threshold for a threshold duration; and
based on determining that the beam quality of the first beam has failed to satisfy the beam quality threshold for the threshold duration, setting the first counter to a threshold-satisfying value;
determining that the first counter satisfies a first threshold; and
based on determining that the first counter satisfies the first threshold, initiating a random access procedure.

* * * * *